Dec. 30, 1958
W. STELZER
2,866,317
BOOSTER BRAKE MECHANISM
Filed Feb. 16, 1953
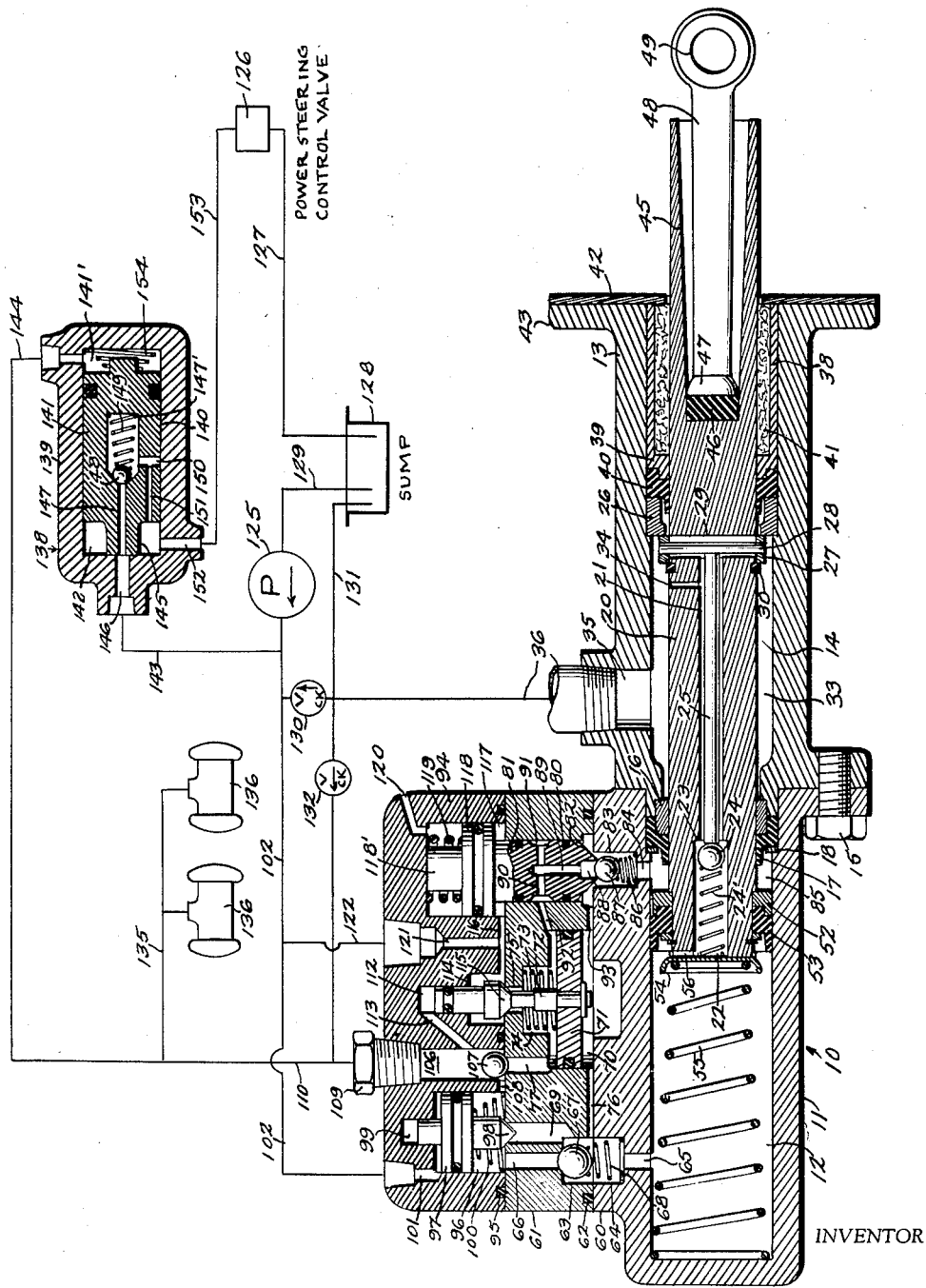
INVENTOR
*WILLIAM STELZER*
BY *John V. Phillips*
ATTORNEY United States Patent Office 2,866,317
Patented Dec. 30, 1958

2,866,317

BOOSTER BRAKE MECHANISM

William Stelzer, Summit, N. J.

Application February 16, 1953, Serial No. 337,003

15 Claims. (Cl. 60—54.5)

This invention relates to a booster brake mechanism, and more particularly to a mechanism of this type wherein hydraulic fluid from a source, such as the pump employed in power steering mechanisms, is utilized for assisting in the braking operation.

An important object of the invention is to utilize the hydraulic fluid system of a steering booster or other hydraulically operated apparatus in conjunction with the operation of hydraulic brakes so that they use the same fluid from the same reservoir.

A further object is to provide a novel control system which operates to transmit hydraulic pressure from the pump or other source directly to the wheel cylinders in proportion to the manual effort performed by the driver in depressing the brake pedal.

A further object is to provide such a system wherein fluid from the pump or other source is transmitted directly to the wheel cylinders to initially apply the brakes without appreciable displacement of hydraulic fluid from the master cylinder upon operation of the brake pedal.

A further object is to provide such a system wherein actual displacement of hydraulic fluid from the master cylinder to the wheel cylinders does not take place until the maximum pressure of the pump or other source is utilized in operating the wheel cylinders.

A further object is to provide a system of this character wherein flow of hydraulic fluid from the master cylinder to the wheel cylinders is positively prevented until the wheel cylinders have had applied thereto the full pressure developed by the pump, after which point the master cylinder is opened to communication with the wheel cylinders for the manual application of additional braking pressures.

A further object is to provide a system of the character referred to wherein it is necessary for manually developed pressures in the master cylinder to match the pressure developed by the pump before the master cylinder is placed in communication with the wheel cylinders, whereby the transition from operation of the wheel cylinders by pressure from the pump to operation of the wheel cylinders by the manually developed pressure in the master cylinder takes place smoothly and without the driver's being conscious of any uneven or "lumpy" operation incident to the change-over.

A further object is to provide an apparatus of this character wherein the novel features of construction and operation are such that the apparatus lends itself especially well to use with a low pedal installation and wherein, in case of power failure, a sufficient end pressure is obtained from the master cylinder operating as a two-stage mechanism.

Other objects and advantages of the invention will become apparent during the course of the following description.

In the drawing I have shown one embodiment of the invention. In this showing:

The figure is a vertical axial sectional view through the booser brake mechanism, parts being shown in elevation and parts of the system being diagrammatically illustrated.

Referring to the drawing, numeral 10 designates a master cylinder as a whole, formed of a preferably integral body 11 defining therein a hydraulic cylinder 12. The master cylinder further comprises a second body 13 in axial alignment with the cylinder 12 and having an axial opening 14 therethrough. The body 12 is bolted as at 15 to the body 11 to form, in effect, an integral unit therewith. At its inner end the body 13 is annularly recessed to receive a bearing 16 to the left of which is arranged a lipped seal 17 retained in position by a ring 18.

A piston indicated as a whole by the numeral 20 is slidable through the bearing 16 and seal 17 and is provided with an axial passage 21 enlarged at its left-hand end as at 22 to form a valve seat 23 engageable by a ball valve 24 urged to closed position by a spring 24'. In the "off" positions of the parts as shown in the drawing, the ball 24 is maintained off its seat by an axial rod 25, controlled in a manner to be described.

Spaced substantially from the bearing 16, the body 13 carries an internal ring 26 defining a shoulder engageable by a slidable ring 27, surrounding the piston 20, and through which pass the ends of a diametrical pin 28 engaged by the rod 25. This pin is permitted to slide axially of the piston 20 by virtue of the provision of a slot 29 formed in the piston 20. Movement of the ring 27 toward the left in the drawing is limited by a snap ring 30 carried by the piston 20, and the ring 27 is movable to the right away from the snap ring 30 upon movement of the piston 20 toward the left away from the ring 26, as will be apparent from the following description.

Between the ring 26 and bearing 16, the axial space 14 defines a chamber 33 communicating with the passage 21 in the piston through a lateral port 34 formed in the piston. The chamber 33 communicates with a port 35 to which is connected a pipe 36 communicating with a sump or reservoir, to be referred to.

In the right-hand end of the body 13 is arranged a sleeve 38 terminating at its inner end in a ring 39 and between the rings 26 and 39 is arranged a lipped seal 40 to prevent leakage of hydraulic fluid from the chamber 33. The sleeve 38 may be filled with suitable packing 41 retained in position by a plate 42 secured to a flange 43 on the end of the body 13 and forming the means for securing the master cylinder unit to the toe board or other part of the vehicle to be supported thereby.

The plunger 20 projects beyond the flange 43 and is provided with an axial recess 45 in the bottom of which is arranged a cushion 46 engageable by a head 47 carried by a rod 48. This rod at its free end is apertured as at 49 for pivotal connection with a suitable part of the brake pedal (not shown) for the manual actuation of the rod 48 and plunger 20.

Adjacent its inner end the plunger 20 is shouldered for the seating of a ring 52 surrounding the plunger, and a lipped seal 53 engages the ring 52. A cup 54 is mounted on the inner end of the plunger and forms a seat for a spring 55 which biases the plunger to the "off" position shown. The inner end of the plunger is laterally grooved as at 56 to provide fixed communication between the cylinder 12 and the adjacent end 22 of the axial piston passage.

The body 10 is provided with an upper integral seat 60 having a machined upper face against which seats a block 61 sealed against leakage with respect to the seat 60 as at 62. The block 61 is provided with a recess 63 aligned with a recess 64 formed in the seat 60 and communicating with the cylinder 12 through a passage 65. The upper end of the recess 63 communicates with a passage 66 having at its lower end a suitable seat engageable by a ball 67 urged upwardly by a spring 68. Communicating with the recess 63, at a point offset from the passage 66, is an upwardly extending passage 69 for a purpose to be described.

Substantially centrally of its length, the block 61 is provided with a cylinder 70 in which is vertically movable a piston 71. The cylinder 70 opens at its lower end to the upper face of the seat 60, and the latter is recessed axially of the cylinder 70. The piston 71 carries a stem 72, and the piston is urged downwardly by a spring 73 arranged in a recess 74 from the upper end of which extends a port 75 for a purpose to be described. The lower end of the cylinder 70 communicates with the recess 63 through a passage 76 formed as a groove which may be milled in the bottom face of the block 61. The upper end of the cylinder 70 communicates with the lower end of a passage 77 extending through the upper face of the block 61 for a purpose to be described.

Toward its right end as viewed in the drawing, the block 61 is provided with a cylinder 80 in which is arranged a vertically movable plunger 81 formed at its lower end as a conical valve 82 engageable with a seat formed at the upper end of a vertical recess 83 in the seat 60, and this recess communicates at its lower end through a port 84 with a space 85 formed in the cylinder 12 between the ring 52 and seal 17. A spring 86 is arranged in the recess 83 and urges upwardly a ball valve 87 engageable with the lower end of a recess 88 formed axially in the bottom of the plunger 81 and communicating with an axial passage 89 in the plunger. This passage, in turn, communicates through radial passages 90 in the plunger with an annular groove 91 formed in the outer surface of the plunger and communicating through a passage 92 with the upper end of the cylinder 70. The lower end of the cylinder 70 communicates through a passage 93 with the lower end of the cylinder 80 beneath the valve 82, and the passage 93 may be milled in the lower face of the block 61.

A cast cap member 94 is arranged above the block 61, and the members 61 and 94 have machined contacting faces which may be sealed against leakage as at 95. Means (not shown), which may be in the form of machine screws, secure the members 60, 61 and 94 in fixed relation to each other. At the left-hand end thereof, the cap member 94 is provided with a cylinder 96 in which is arranged a piston 97 having a stem the lower end of which is formed as a conical valve 98 engaging the upper end of the passage 69. The upper end of the stem of the piston 97 preferably operates in a guide recess 99. A spring 100 urges the piston 97 upwardly to tend to open the valve 98. The upper end of the cylinder 96 communicates with a passage 101 the upper end of which is connected to a pipe line 102, to be described.

The cap member 94 is provided with a vertical passage 106 in which is arranged a ball 107 adapted to seat on the upper end of the passage 77 to act as an upwardly opening check valve. The passage 106 communicates through a passage 108 with the bottom of the cylinder 96, and the passage 108 may be milled in the bottom face of the cap member 94. The upper end of the passage 106 is shown as being provided with a union 109 for connecting it to a pipe line 110 for a purpose to be described. If desired, a conventional residual pressure valve may be substituted for the union 109 or connected in the line 110, but the use of such valve is unnecessary, as will become apparent below.

The upper end of the stem 72 of the piston 71 operates in a vertical cylinder 112 formed in the cap member 94, and the upper end of this cylinder communicates through a passage 113 with the passage 106 above the ball 107. Below the cylinder 112 and coaxial therewith the cap member 94 is provided with a recess 114 in which is arranged a valve 115. This valve seats on the upper end of the passage 75, and when the valve is opened under conditions to be described, the upper end of the cylinder 70 communicates with the recess 114 and thence with a passage 116 formed by milling the bottom face of the cap member 94. The passage 116 communicates at all times with the lower end of a cylinder 117 in which is arranged a piston 118 carried by the upper end of the plunger 81. The piston 118 is urged downwardly by a spring 119, and the upper end of the cylinder 117 is vented to the atmosphere as at 120. The piston 118 has an axial, upwardly extending projection 118' to limit upward movement of the piston 118 and plunger 81. The passage 116 intermediate its ends is in constant communication with a vertical passage 121 to which is connected a pipe line 122, leading to the pipe line 102.

The pipe line 102 leads to the outlet side of a hydraulic pump 125 of the type customarily used for supplying hydraulic fluid under pressure for the operation of power vehicle steering mechanisms, the latter being provided with a control valve 126 through which hydraulic fluid is constantly circulated. The outlet side of the valve 126 is connected by a line 127 to a sump or other reservoir 128, and a pipe 129 leads from the sump to the inlet of the pump 125. The line 36 is connected to the line 102 through a check valve 130 opening into the latter line. The pipe line 36 is also connected to a pipe line 131 one end of which leads to the sump 128, and the pipe 131 is connected to the line 110 with a check valve 132 interposed in the line 131 between the lines 36 and 110 and opening toward the line 110 for a purpose to be described.

The line 110 is suitably branched as at 135 to lead to the wheel cylinders 136 of the vehicle, two of which have been shown in the drawing for the purpose of illustration.

A novel type of valve device, indicated as a whole by the numeral 138, is employed to increase the bypass pressure of the pump 125 to insure the maintenance of pump pressure supply to the wheel cylinders to suitably lengthen the power-operated stage of the mechanism as further described below. The valve device 138 is illustrated as comprising a valve body 139 suitably provided with an interior cylinder 140 in which is arranged a shuttle valve 141. This valve divides the cylinder 140 into a pair of chambers 141' and 142, the latter of which is connected by a line 143 to the line 102 leading to the outlet side of the pump. The chamber 141' is connected by a line 144 to the pipe line 110. The valve 141 is provided with a reduced end 145 forming a valve engaging the left-hand end of the cylinder 140 to control a relatively large passage 146 connected to the line 143. Within the valve 141 is formed a substantially smaller axial passage 147 normally communicating with the passage 146. The valve 141 is further provided with an enlarged chamber 147' the left-hand end of which forms a seat engageable by a ball valve 148 controlling the passage 147 and urged to closed position by a spring 149. A lateral passage 150 communicates with the chamber 147' and with a restricted passage 151 leading to the chamber 142. This chamber has a lateral passage 152 to which is connected a line 153 leading to the inlet side of the power steering control valve 126. A light spring 154 urges the valve 141 to the normal position shown in the drawing.

Operation

The parts normally occupy the positions shown in the drawing, assuming that the pump 125 is running. In such a case, pump pressure will be supplied through line 102 to the top of the cylinder 96, and the piston 97 will be in the lower position shown, with the valve 98 closed. The pump pressure is also transmitted through lines 102 and 122 and passages 121 and 116 to the recess 114 and to the bottom of the cylinder 117. Pressure in the cylinder 117 maintains the piston 118 in its upper position, with the valve 82 open but with the valve 87 closed, the spring 86 causing the valve 87 to follow the plunger 81 in its upward movement. The valve 115 will be closed, and no fluid will flow from the pump past the valve 115.

When the brake is to be operated, the pedal will be depressed and the rod 48 and piston 20 will be moved toward the left. At the beginning of this operation, of course, the ball 24 will be unseated and the cylinder 12 will be in communication through passage 21 with the chamber 33. The chamber 33, in turn, communicates with the sump 128 through the lines 36 and 131. A short initial movement of the plunger 20 to the left releases the ring 27 from the ring 26, whereupon the rod 25 is free to move toward the right to allow the ball to seat under the influence of the spring 24'. A slight additional movement of the piston 20 displaces fluid from the cylinder 12 through passage 65, recess 64, and passage 76 into the lower end of the cylinder 70. The lower end of the cylinder 70 is in communication with the space 85 since the valve 82 will be open, thus preventing a reduction in pressure back of the ring 52. The introduction of fluid into the bottom of the cylinder 70 lifts the piston 71 to open the valve 115.

Fluid from the pump 125 will now flow through lines 102 and 122, through passages 121 and 116, past valve 115 into the upper end of the cylinder 70, thence through passage 77 to lift the ball 107 and flow through lines 110 and 135 to the brake cylinders. As long as the valve 115 remains open, this flow of hydraulic fluid from the pump to the wheel cylinders will continue. In this connection it may be pointed out that the piston 71 is hydraulically balanced. The opening of the valve 115 upon operation of the piston 20 is accomplished against only negligible resistance of the spring 73, acting as a cut-in spring.

The piston 20 in its movement to the left will continue to build up pressure beneath the piston 71 to maintain the valve 115 open. Whenever the pumped pressure becomes equal to the pressure beneath the piston 71, the valve 115 will close and, accordingly, the supplying of pumped hydraulic pressure to the wheel cylinders will be under the control of the pressure beneath the piston 71, which in turn, is under the control of the operator in moving the brake pedal.

Assuming that the pump 125 develops a maximum pressure of 300 p. s. i., it will be apparent that such maximum pressure is always present above the piston 97. When such maximum pressure is reached in the wheel cylinders through valve 115, passage 77 and passage 106, pressure from the latter will be communicated through passage 108 to the cylinder 96 to balance the pressure of the pump acting above the piston 97. This piston will then be hydraulically balanced and the spring 100 will move it upwardly to open the valve 98.

The operation up to this point will have taken place with a minor degree of movement of the piston 20, but beyond this point, hydraulic fluid will flow from cylinder 12 through passage 65, upwardly through passage 69 to the cylinder 96 and thence through passages 108 and 106 to the wheel cylinders. The pressure now manually developed will exceed the pump pressure, and the higher pressure will be present in the passage 106 to seat the ball 107 and thus cut off communication between the passage 106 and the pump, around valve 115, regardless of the fact that this valve remains open. The operator may continue to build up pressure to the desired maximum extent in the wheel cylinders.

From the foregoing it will be apparent that in the application of braking forces the valve mechanism will be controlled by initial operation of the piston 20 to cause hydraulic fluid to be supplied under pump pressure to the wheel cylinders until the maximum pump pressure is reached in the latter. The pump therefore supplies all of the volume of hydraulic fluid necessary to move the brake shoes into engagement with the drums and to supply braking pressures up to a given point without the displacement of a substantial amount of fluid from the cylinder 12. In view of the fact that the valve 82 is maintained opened during the operation referred to, the feeding of the fluid from the cylinder 12 into the space 85 results in utilization of an effective area of the piston substantially equal to the piston proper without the seal 53, and accordingly relatively high manual pressures may be generated.

It will be noted that the supplying of manually displaced fluid from the cylinder 12 to the wheel cylinders starts with the pressure in the wheel cylinders equal to that in the cylinder 12 due to the hydraulic balancing of the piston 71. Therefore, the operator will not feel the transition from power to manual operation. Moreover, the brakes having been "set" by hydraulic fluid from the pump, very little movement of the plunger 20 is necessary for setting the brakes to the maximum extent. The total brake pedal movement, therefore, is very slight, but since pressures in the wheel cylinder are always the same as pressures in the cylinder 12, the brake pedal is provided with accurate "feel."

When the brake pedal is released, fluid flows from the brake cylinders through lines 135 and 110, passages 106 and 108, cylinder 96 and passage 66, the ball 67 being unseated for the return flow of the fluid into the master cylinder. When the "off" position is reached, the ring 27 engages the ring 26 to unseat the ball 24, and excess fluid in the master cylinder flows through passage 21 in the piston and into chamber 33, thence through lines 36 and 131 back to the sump 128. Fluid previously in the space 85 will flow past valve 82 and through passages 93 and 76 back to the cylinder 12.

For relatively light brake applications the valve 24 operates as a modulating valve. The valve 115 permits flow of fluid only in one direction to admit fluid under pressure from the pump to the wheel cylinders, but it cannot relieve fluid from the wheel cylinders because of the seating of the valve 107. In the power stage of operation, initial movement of the piston 20 closes the ball valve 24 and moves piston 71. In a light brake application, the operator may ease off on the pedal, which will first close the valve 115, and as the piston 20 yields further to pressure in the chamber 12 as pressure on the brake pedal is relieved, fluid from the wheel cylinders reacts on the piston 20 through valve 67. The retractile movement of the piston, however, is so small that it could not release the brakes. When the piston then comes to the point where the valve 24 is cracked, fluid is released past this valve until a balance is established between pressure in the chamber 12 and the mechanical force applied to the piston 20, and accordingly the valve 24 acts as a modulating valve.

It will be apparent that the spring 68 exerts some upward force against the valve 67, and accordingly this valve will be seated while a pressure somewhat above that of the atmosphere remains in the brake lines and brake cylinders. The valve 67 accordingly acts as a residual pressure valve unless the pump 125 is not working, in which case the valve 98 will be unseated by spring 100, and hydraulic fluid from the wheel cylinders will return through passage 69 and will be at atmospheric pressure. This, however, is not disadvantageous, and any contraction of fluid in the brake lines will be satisfied by the flow of fluid from chamber 12, which is permitted by virtue of the fact that the ball 24 is normally unseated.

In the event of a failure of power, the present device is fully operative as a two-stage manually operable brake. Assuming that no pressure is being delivered by the pump, the spring 100 will maintain the valve 98 open. There will be no pressure beneath the piston 118, and the valve 82 will be closed. Therefore, when the pedal is operated, fluid will flow from the master cylinder upwardly through passages 65, 69, 108, and 106 into the brake lines to apply the brakes. The build-up of pressure by manual operation of the piston will cause such pressure to act upwardly on piston 71 to open the valve 115 whereby suction in the space 85 will pull fluid past valve 115 through passages 92, 90, and 89, to open the valve 87, and fluid will flow to the space 85. During such period of operation, fluid displaced from the master cylinder will be in proportion to the full area of the piston and master cylinder to set the brake shoes with minimum movement of the piston. Thereafter, the building-up of higher master cylinder pressure will be transmitted through passage 93 to the bottom of the cylinder 80 to act upon the valve 82 and elevate it for the flow of fluid from the master cylinder into the space 85. The effective area of the master cylinder piston will then become approximately the area of the piston rod 20 for the development of higher second stage braking pressures.

The valve mechanism 138 is not essential to the operativeness of the mechanism but is advantageous for the purpose of increasing the effective pressure of the pump and to lengthen the power stage of operation. Normally, in a hydraulically operated power steering mechanism, fluid flows from the pump through the steering control valve, thus tending to reduce available pressures for use in applying the brakes. This would merely shorten the power operation by limiting the available pressure above the piston 71, and pressure developed by the piston 20 would overbalance this pump pressure at an earlier stage.

With the use of the valve mechanism 138 and when the brakes are not in operation, pressure from the inlet side of the pump maintains the shuttle valve 141 in its right-hand limit of movement, providing substantially unrestricted flow of fluid between passages 146 and 152. When the brake mechanism is put into operation, the hydraulic pressure affecting the brake cylinders is communicated through line 144 to the chamber 141 to maintain the shuttle valve 141 in the position shown, thus tending to restrict the flow of hydraulic fluid to the power steering control valve through passage 147 and past relief valve 148 and through passages 150 and 151. A somewhat higher pressure is thus rendered available for the operation of the brakes, and this lengthens the power stage since it requires the development of a higher pressure in the chamber 12 to lift the piston 71 against the pump pressure above this piston. Moreover, the valve 148 remains closed until a pressure of 400 or 500 p. s. i. is reached (or some other predetermined pressure below the maximum pump pressure). This leaves some pressure available for the steering booster if the brake and steering boosters are operated simultaneously.

The mechanism, as will be apparent from the foregoing, embodies a substantial number of distinct advantages. It provides for the use of hydraulic pressure from a pump or other source to apply the brakes wholly under the control of the operator and to provide manually operable means for securing a brake application beyond that which is possible by the pumped hydraulic pressure. The structure is also such that a very rapid application of force to the brake pedal cannot bypass fluid from the cylinder 12 to the wheel cylinders. Fluid initially displaced from the cylinder 12 can flow only through passages 65 and 76 into the bottom of the cylinder 70 and past valve 82 into the space 85, and there is no possible way that master cylinder fluid can flow to the wheel cylinders until the hydraulic pressure from the pump has acted beneath the piston 97 to open the valve 98. This is the intended operation and must occur under all conditions of operation of the brake pedal.

If the valve 115 is made of metal, there necessarily will be some slight leakage past such valve when the brake mechanism is inoperative and the pump 125 is operating. This leakage is not objectionable and will always maintain a residual pressure in the brake lines, but this pressure is prevented from accumulating beyond the desired point by either or both of the valves 67 and 87. Hydraulic fluid leaking past the valve 115 can flow through passages 92, 90 and 89 to unseat the valve 87 and flow into the space 85 from which it can return to the cylinder 12 past the lip of the seal 53. Under such conditions the fluid drawn into the chamber 85 is supplied through check valve 130 and through either or both of the lines 36 and 131.

As previously stated, some slight leakage will occur past the valve 115 when the latter is closed, if this valve is made of metal. If the valve is made of a material which will afford perfect seating without leakage, it is advisable to use the check valve 132 to prevent under all conditions the occurrence of sub-atmospheric pressure in the brake lines if the hydraulic fluid therein should contract.

I claim:

1. A hydraulic brake system comprising wheel cylinders to apply the brakes, a source of hydraulic pressure, passage means connected between said source and the wheel cylinders, a master cylinder having a piston therein, a normally closed control valve in said passage means having a pressure responsive operating member exposed to pressure generated by said piston upon movement thereof from a normal off position for opening said valve, a flow line connected between said master cylinder and the wheel cylinders, a second valve for controlling communication through said flow line, and a pressure responsive device connected to said second valve and exposed at one side thereof to pressure from said source and at the other side to pressure of hydraulic fluid delivered to the wheel cylinders, said pressure responsive device being biased for movement to open said second valve whereby, when pressure at said other side of said pressure responsive device equals the pressure at said one side thereof, said second valve will open to connect said master cylinder to said wheel cylinders.

2. A hydraulic brake system comprising wheel cylinders to apply the brakes, a source of hydraulic pressure, passage means connected between said source and the wheel cylinders, a master cylinder having a piston therein, a normally closed control valve in said passage means having a pressure responsive operating member exposed to pressure generated by said piston upon movement thereof from a normal off position for opening said valve, a flow line connected between said master cylinder and the wheel cylinders, a control cylinder, a control piston movable therein and dividing it into a pair of chambers one of which communicates with said source and the other of which communicates with pressures from said master cylinder, a valve carried by said control piston and normally occupying a closed position when subject to pressure from said source to cut off communication between said master cylinder and said other chamber, and means biasing said last-named valve toward open position whereby, when pressures in said chambers are balanced, said last-named valve will be opened to provide for the flow of hydraulic fluid from said master cylinder to said wheel cylinders.

3. Apparatus in accordance with claim 2 provided with a passage through which said other chamber communicates with said master cylinder, and a check valve controlling such passage for the return of hydraulic fluid from said other chamber to said master cylinder when pressure in the latter is below the pressure in said wheel cylinders.

4. A hydraulic brake system comprising wheel cylinders to apply the brakes, a source of hydraulic pressure, passage means connected between said source and the wheel cylinders, a master cylinder having a piston therein, a normally closed control valve in said passage means having a pressure responsive operating member exposed to pressure generated by said piston upon movement thereof from a normal off position for opening said valve, a check valve in said passage means between said control valve and the wheel cylinders adapted to close away from the wheel cylinders, a flow line connecting said master cylinder to said passage means between said check valve and said wheel cylinders, a third valve in said flow line, and means exposed to pressure in said wheel cylinders and in said source and connected to said third valve for opening the latter when pressure in the wheel cylinders increases substantially beyond the pressure in said source.

5. In combination with a hydraulic pump and a control valve means, a hydraulic line connecting said pump to said control valve means, a return line from said control valve means to said pump, a hydraulically operable device, a fluid line connecting such device to said hydraulic line between said pump and said control valve means, a normally closed valve in said fluid line, a master cylinder having a piston therein movable in one direction from a normal off position to displace fluid from said master cylinder, means connected to said normally closed valve and exposed to pressure in said master cylinder for opening said fluid line for the flow of fluid from said pump to said hydraulically operable device, and an auxiliary control device in said hydraulic line between said control valve means and the point of connection of said fluid line to said hydraulic line, said auxiliary control device comprising a normally open valve device providing for the free flow of fluid from said pump to said control valve means and having a pressure area exposed to pressure between said normally closed valve and said hydraulically operable device for moving said normally open valve to closed position, such valve having fluid flow restricting passage means for restricting the flow of fluid from said pump to said control valve means.

6. A hydraulic brake system comprising wheel cylinders to apply the brakes, a source of hydraulic pressure, a master cylinder having a manually operable piston therein, connections between said source and the wheel cylinders, a control valve in said connections, a check valve in said connections between said control valve and the wheel cylinders closing away from said wheel cylinders, means exposed to pressures generated in said master cylinder upon initial movement of said piston away from a normal "off" position for opening said control valve, a pair of chambers one of which communicates with said source and the other of which communicates with said connections between said check valve and said wheel cylinders, a pressure responsive element dividing said chambers, a valve carried by said pressure responsive element and held in closed position thereby when pressure in said one chamber exceeds pressure in said other chamber, and means biasing said last-named valve to open position whereby, when pressures in said chambers become approximately equal, such valve will open to connect said master cylinder to said wheel cylinders.

7. Apparatus constructed in accordance with claim 6 provided with a passage communicating between said other chamber and said master cylinder, and a check valve in said passage closing away from said master cylinder whereby, when pressures in said other chamber exceed pressures in said master cylinder, said second-mentioned check valve will open for the flow of hydraulic fluid from said wheel cylinders to said master cylinder.

8. A hydraulic brake system comprising wheel cylinders to apply the brakes, a source of hydraulic pressure, a master cylinder having a manually operable piston therein, a cylinder having a control piston therein dividing it into a pair of chambers one of which is in constant communication with said master cylinder and the other of which communicates with said wheel cylinders, connections between said other chamber and said source, a valve in said connections connected to said control piston and controlling communication between said other chamber and said source, means biasing said valve to closed position away from said source whereby pressure in said one chamber generated upon movement of said manually operable piston will open said valve for the flow of fluid from said source to said wheel cylinders, passage means connected between said master cylinder and the wheel cylinders, and means exposed to and movable upon a rise in pressure in said wheel cylinders to a predetermined point for opening communication through said passage means between said master cylinder and said wheel cylinders.

9. Apparatus constructed in accordance with claim 8 wherein said passage means comprises a cylinder, said means for opening communication through said passage means comprising a pressure responsive element in said last-named cylinder dividing it into a pair of chambers one of which communicates with said source and the other of which communicates with said wheel cylinders, a valve carried by said last-named pressure responsive element held in closed position thereby when pressure in said source exceeds pressure in said wheel cylinders, and means biasing said last-named pressure responsive element for movement of said last-named valve to open position to connect said master cylinder to said wheel cylinders when pressures in said last-named chambers are balanced.

10. A hydraulic brake system comprising wheel cylinders to apply the brakes, a source of hydraulic pressure, a master cylinder having a manually operable piston therein, a control cylinder, a pressure responsive element therein dividing it into a pair of chambers one of which is in fixed communication with said master cylinder and the other of which has a first passage for connecting it with said source and a second passage connecting it to said wheel cylinders, a valve in said first passage connected to said pressure responsive element to be closed thereby when said pressure in said other chamber exceeds pressure in said one chamber, means biasing said valve to closed position, a check valve in said second passage closing away from said wheel cylinders, a second pressure responsive element having one side thereof exposed to pressures in said source and the other side exposed to pressures in said second passage, passage means for connecting said master cylinder to said second passage between said check valve and said wheel cylinders, a second valve connected to said second pressure responsive element and closing said passage means when pressure in said source exceeds pressure in said wheel cylinders, and means biasing said second valve to open position whereby such valve opens when pressures in said source and said wheel cylinders are equal to connect said master cylinder to said wheel cylinders.

11. Apparatus constructed in accordance with claim 10 provided with a second passage communicating between said wheel cylinders and said passage means, and a check valve controlling said second passage and movable to open position for the return of fluid from said wheel cylinders to said master cylinder when pressures in the former exceed pressures in the latter.

12. Apparatus constructed in accordance with claim 10 wherein said manually operable piston is connected to a piston rod and said master cylinder carries a seal spaced from said piston rearwardly thereof, and a valve having a pressure movable element exposed to pressure in said passage to be moved to open position by pressure in said source for connecting said one chamber to the space between said piston and said seal.

13. Apparatus constructed in accordance with claim 10 wherein said manually operable piston is connected to a piston rod and said master cylinder carries a seal spaced from said piston rearwardly thereof, a passage connected between said one chamber and the space between said piston and said seal, a valve in said last-named passage biased to closed position, and a piston carried by said last-named valve and having a face constantly exposed to pressures in said source to hold said last-named valve in open position, said last-named valve constituting a pressure face exposed to pressures in said last-named passage whereby such pressures will open said valve upon a manual operation of said manually operable piston during a power failure in said source.

14. A hydraulic brake system comprising wheel cylinders to apply the brakes, a hydraulic master cylinder having a piston therein dividing it to form a high pressure chamber and a low pressure chamber, said piston having a piston rod, smaller in cross sectional area than said piston, projecting in one direction from said master cylinder through said low pressure chamber, a source of hydraulic fluid pressure having connections between said source and said wheel cylinders, valve means in said connections, pressure responsive means connected to said valve means and exposed to pressures in said high pressure chamber upon movement of said piston in the other direction for opening said valve means to supply fluid under pressure from said source through said connections to the wheel cylinders, passage means for supplying fluid from said source to said low pressure chamber when said valve means is opened, and means exposed to pressure in said source and in said high pressure chamber and operable upon generation of a predetermined pressure in said high pressure chamber upon a failure of power in said source for supplying fluid from said high pressure chamber to said low pressure chamber to prevent a vacuum pressure from occurring therein and for supplying fluid to said wheel cylinders for actuating the same.

15. A hydraulic brake system comprising wheel cylinders to apply the brakes, a hydraulic master cylinder having a piston therein dividing it to form a high pressure chamber and a low pressure chamber, said piston having a piston rod, smaller in cross sectional area than said piston, projecting in one direction from said master cylinder through said low pressure chamber, a source of hydraulic fluid pressure having connections with said wheel cylinders, valve means having a pressure responsive element exposed to pressures in said high pressure chamber upon movement of said piston in the other direction for opening said valve means to supply fluid under pressure from said source through said connections to the wheel cylinders, passage means connected between said valve means and said low pressure chamber for supplying fluid to the latter when said valve means is opened, a valve controlling communication between said high pressure chamber and said low pressure chamber, pressure responsive means exposed to pressure in said source for maintaining said valve open, means biasing said valve to closed position, said valve having a pressure face subject to pressures in said master cylinder whereby, when pressure in said source fails and said biasing means closes said valve, the generation of a predetermined pressure in said high pressure chamber upon manual operation of said piston will cause such pressure to act against said valve face to open said valve and connect said high pressure chamber to said low pressure chamber for preventing a vacuum from developing therein, flow means connected between said high pressure chamber and the wheel cylinders, a flow control valve in said flow means biased to open position, and a pressure responsive device connected to said flow control valve and exposed to pressure in said source to normally maintain said flow control valve closed.

References Cited in the file of this patent

UNITED STATES PATENTS

| | | |
|---|---|---|
| Re. 19,681 | Hayes | Aug. 27, 1935 |
| 1,886,309 | Scott | Nov. 1, 1932 |
| 2,322,063 | Schnell | June 15, 1943 |
| 2,331,238 | Schnell | Oct. 5, 1943 |
| 2,368,043 | Schnell | Jan. 23, 1945 |
| 2,414,675 | Stelzer | Jan. 21, 1947 |
| 2,499,775 | Piganeau | Mar. 7, 1950 |
| 2,503,892 | Vickers | Apr. 11, 1950 |
| 2,636,349 | Schnell | Apr. 28, 1953 |

FOREIGN PATENTS

| | | |
|---|---|---|
| 443,448 | Great Britain | Feb. 28, 1936 |
| 47,185 | France | Nov. 7, 1936 |
| 835,760 | France | Oct. 3, 1938 |